Feb. 5, 1946.     C. F. OSGOOD     2,394,006
MATERIAL HAULAGE VEHICLE
Filed April 18, 1944      4 Sheets-Sheet 1
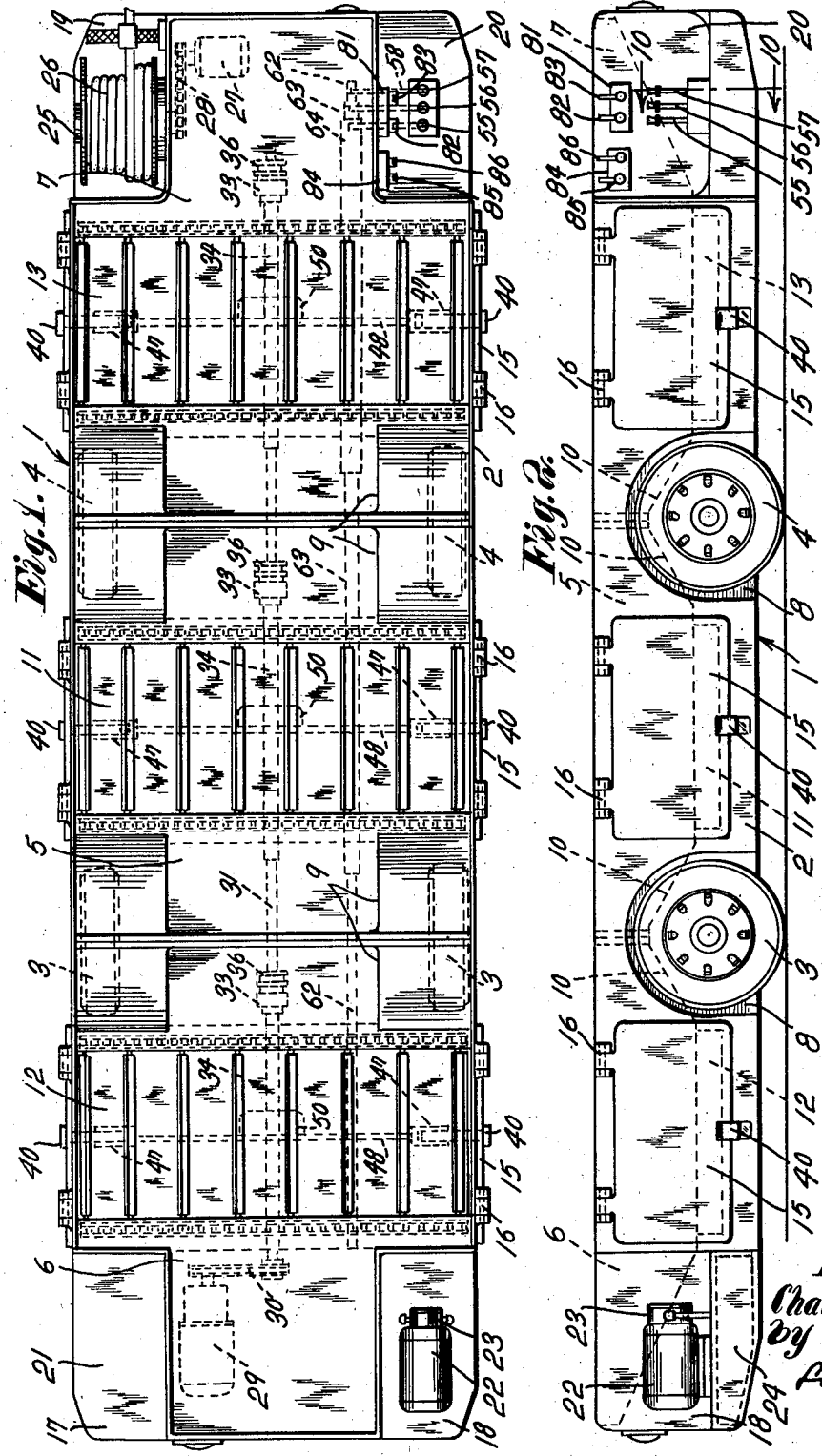
Inventor:
Charles F. Osgood.
by
Atty.

Feb. 5, 1946.     C. F. OSGOOD     2,394,006
MATERIAL HAULAGE VEHICLE
Filed April 18, 1944     4 Sheets-Sheet 2
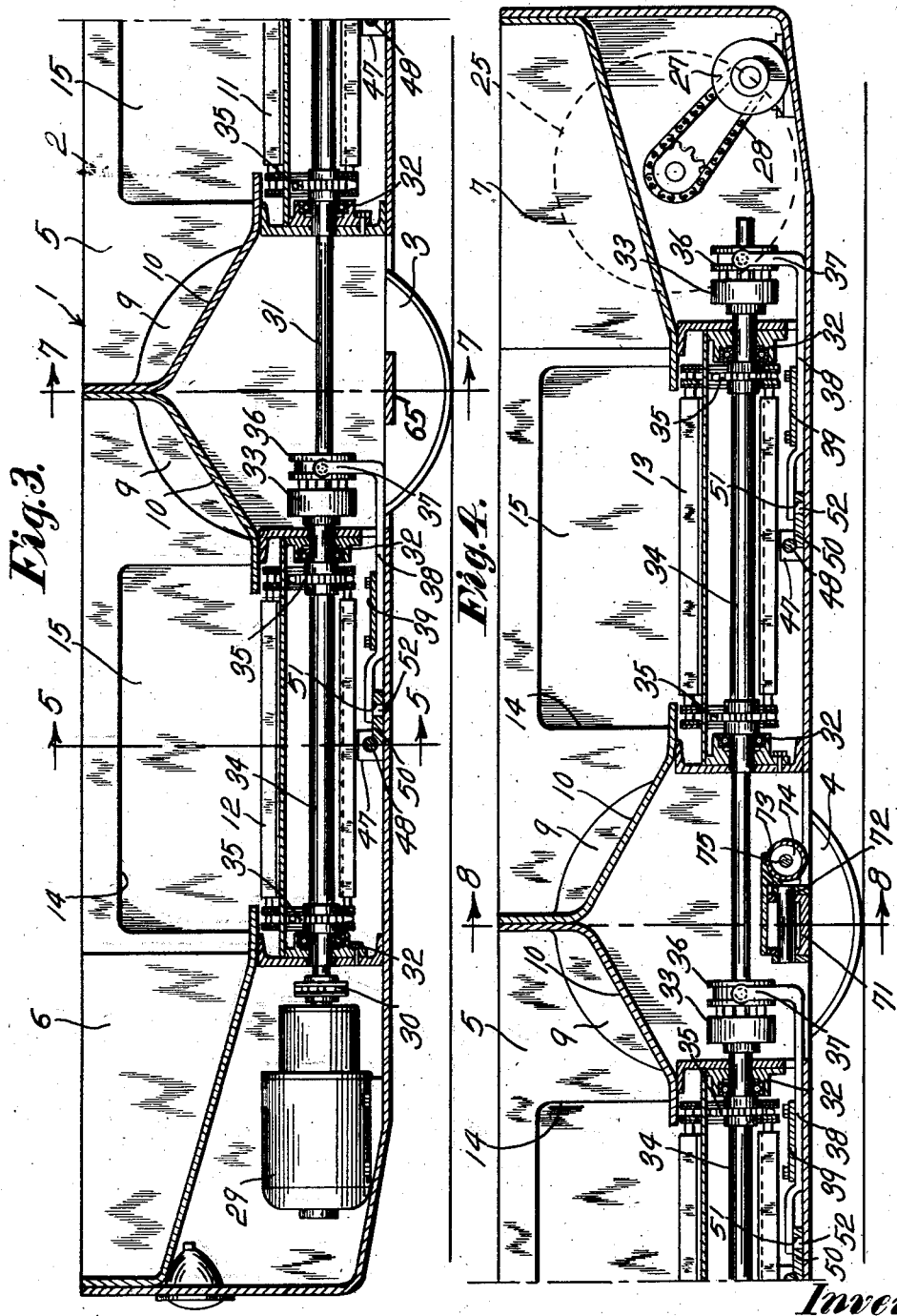

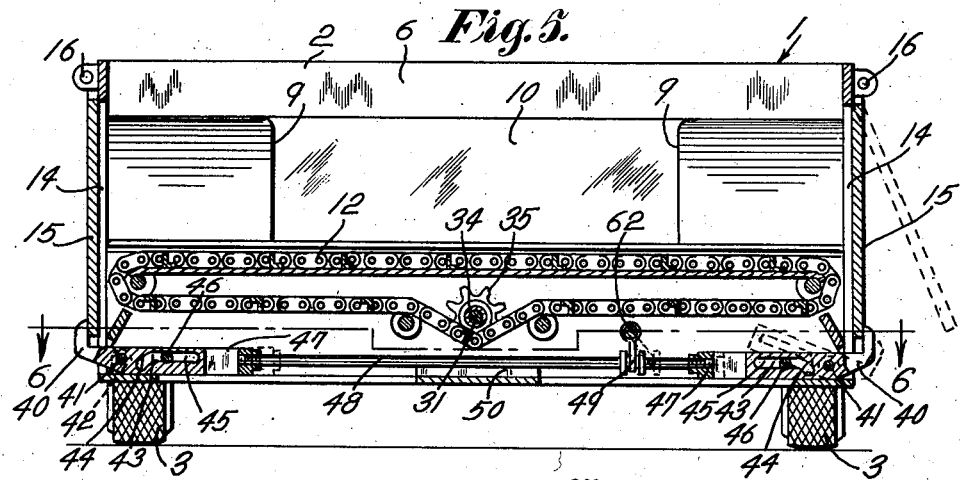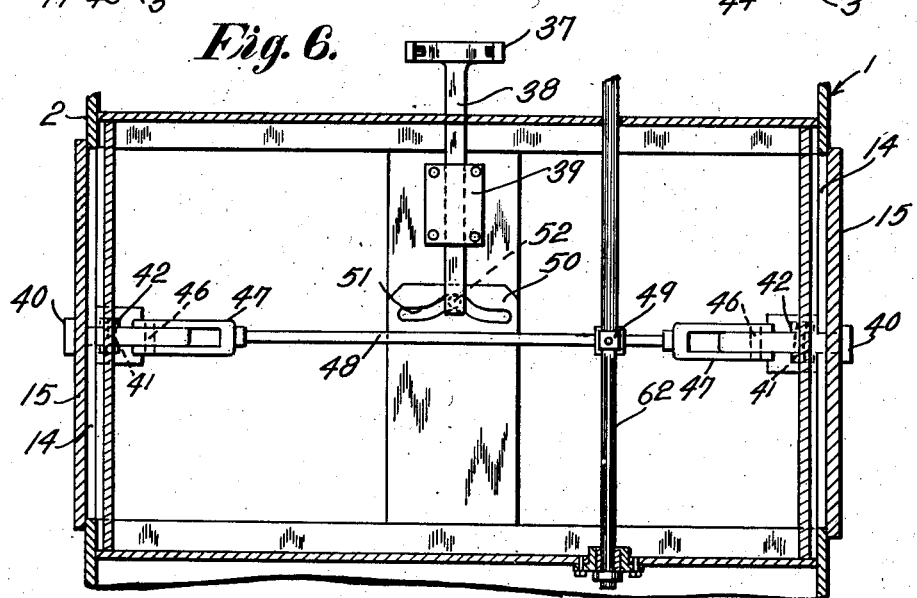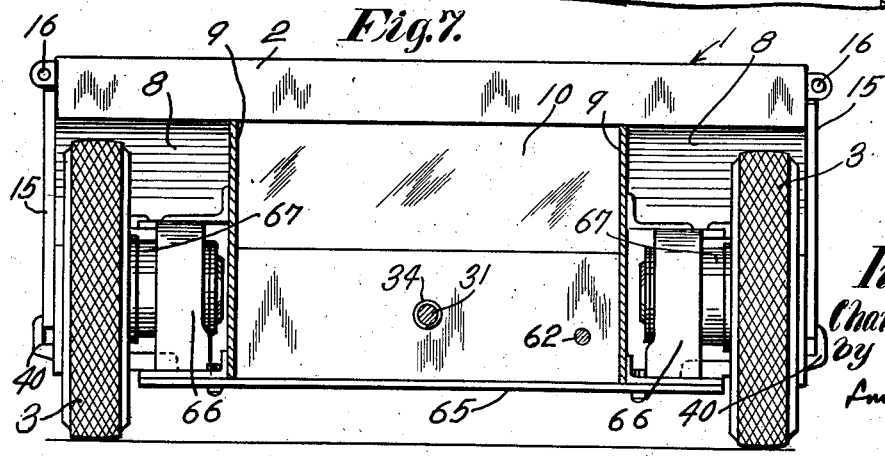

Feb. 5, 1946. C. F. OSGOOD 2,394,006
MATERIAL HAULAGE VEHICLE
Filed April 18, 1944 4 Sheets-Sheet 4
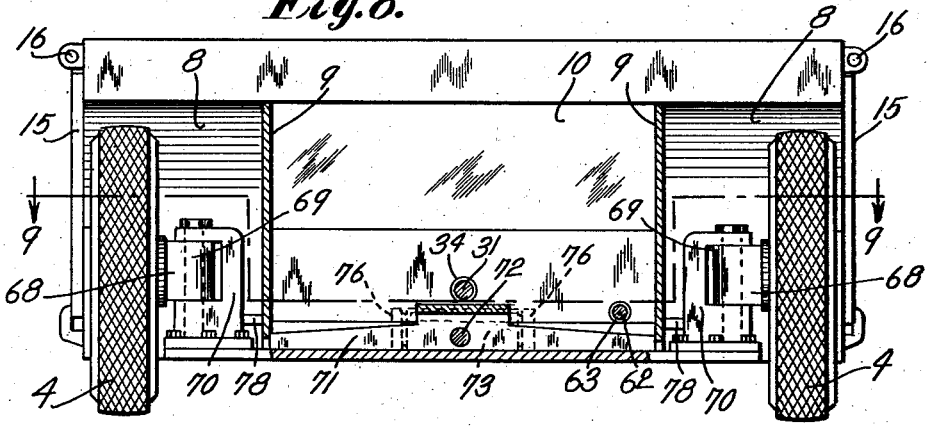
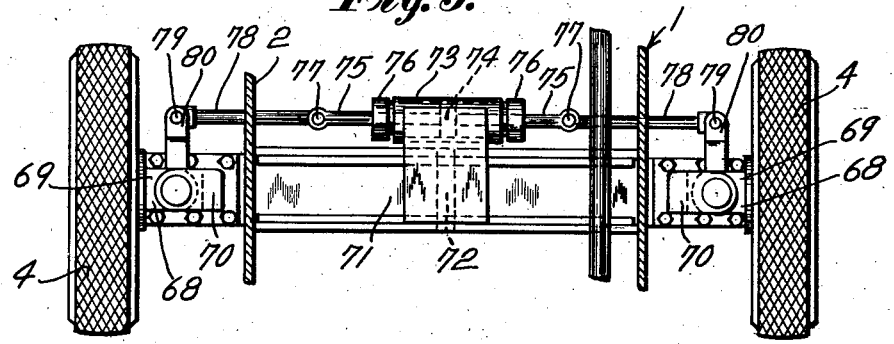
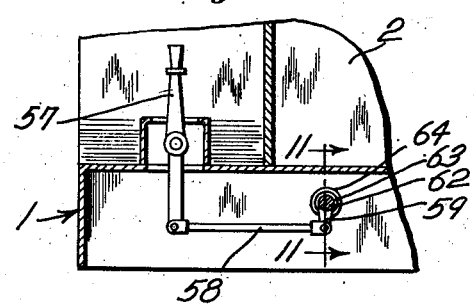
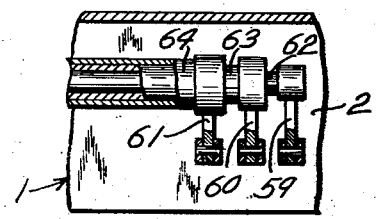
Inventor:
Charles F. Osgood.
by
Atty.

Patented Feb. 5, 1946

2,394,006

UNITED STATES PATENT OFFICE 2,394,006

MATERIAL HAULAGE VEHICLE

Charles F. Osgood, Claremont, N. H., assignor to Sullivan Machinery Company, a corporation of Massachusetts Application April 18, 1944, Serial No. 531,575

24 Claims. (Cl. 214—83)

This invention relates to a material haulage vehicle and more particularly to an improved material haulage vehicle especially designed for use in underground mines having low head room.

The invention, from one aspect, may comprise a material haulage vehicle of relatively large capacity having a relatively low and wide, vertically compact body providing a plurality of material receiving compartments and having embodied therein means for moving the material transversely of the compartments to discharge through a side of the vehicle body without increasing the height of the vehicle during discharge of the material. The vehicle, in one embodiment, may have its body mounted on wheels equipped with pneumatic rubber tires adapted to run directly along the ground surface without the aid of a guiding trackway, and the material receiving compartments may be arranged in a relatively low position with respect to the wheels, close to the ground surface along which the vehicle travels. Spaces may be formed in the body between the compartments within the lateral limits of the body, and the steering and propelling wheels are arranged in these spaces. There may be provided closure members in the form of movable walls or doors at the side of the vehicle body through which the material may be discharged laterally from the compartments. The means for moving the material transversely of the compartments to discharge through a side of the vehicle body may comprise endless conveyors extending across the vehicle body at the bottoms of the compartments, and these conveyors may be independently or concurrently driven by a motor under the control of clutches. Also, in a preferred embodiment, the conveyors may be reversible and the closure members may be provided at both sides of the compartments so that the material may be discharged selectively through either side of the vehicle body. These doors may be held in closed position by means of releasable latches, and remote control means may be provided for the door latches, and such control means may be coordinated with the control for the conveyor clutches so that release of the door latches may always occur prior to the operation of the conveyors. One pair of the rubber-tired wheels may be traction wheels and the other pair steering wheels or all four wheels may be steering and traction wheels, and the traction wheels may be provided with individual driving motors and the steering wheels may be power operated and controlled. The control means for the door latches and the conveyor clutches and the control means for the motors of the vehicle may be operated from the operator's station at one end of the vehicle.

An object of the present invention is to provide an improved material haulage vehicle. Another object is to provide an improved material haulage vehicle having improved means for discharging the material therefrom. A further object is to provide an improved material haulage vehicle having improved means for discharging the material through a side of the vehicle body without increasing the overall height of the vehicle during such discharge. Yet another object is to provide an improved material haulage vehicle of extremely low height and relatively large capacity especially designed for use in underground mines having low head room. A still further object is to provide an improved material haulage vehicle having propelling and steering wheels equipped with pneumatic rubber tires adapted to run directly over the ground surface without the aid of a guiding trackway, and having a plurality of material receiving compartments arranged in a novel manner with respect to the wheels, close to the ground surface. Another object is to provide an improved arrangement including a transverse conveyor at the bottom of each compartment for moving the material laterally from the compartments to discharge from a side of the vehicle body. A further object is to provide an improved discharge means including movable side walls or doors whereby the material may be discharged through either side of the vehicle, and reversible conveying means for moving the material laterally from the compartments in either direction. Still another object is to provide an improved remote control mechanism for controlling the door latches and conveyor clutches whereby release of the latches is assured prior to the application of the clutches. These and other objects and advantages of the invention will, however, hereinafter more fully appear.

In the accompanying drawings there is shown for purposes of illustration one form which the invention may assume in practice.

In these drawings:

Fig. 1 is a plan view of an illustrative embodiment of the improved material haulage vehicle.

Fig. 2 is a side elevational view of the vehicle shown in Fig. 1.

Figs. 3 and 4, when taken together, constitute an enlarged view in longitudinal vertical section taken centrally through the vehicle shown in Fig. 1.

Fig. 5 is a cross sectional view taken substantially on line 5—5 of Fig. 3.

Fig. 6 is a horizontal sectional view taken substantially on line 6—6 of Fig. 5.

Fig. 7 is a cross sectional view taken substantially on line 7—7 of Fig. 3.

Fig. 8 is a cross sectional view taken substantially on line 8—8 of Fig. 4.

Fig. 9 is a horizontal sectional view taken substantially on line 9—9 of Fig. 8.

Fig. 10 is an enlarged detail sectional view taken on line 10—10 of Fig. 2, illustrating a portion of the control means for the door latches and conveyor clutches.

Fig. 11 is an enlarged detail sectional view taken on line 11—11 of Fig. 10.

In this illustrative embodiment of the invention, there is shown a material haulage vehicle, generally designated 1, of relatively large capacity and of extremely low height, especially designed for use in underground mines having low head room. The vehicle includes an elongated, relatively wide and low, vertically compact body 2 preferably of a fabricated welded steel construction mounted on propelling and steering wheels 3 and 4. The wheels are preferably provided with pneumatic rubber tires adapted to run directly along the ground surface without the aid of a guiding trackway. The vehicle body 2 is divided into a plurality, herein three, of longitudinally spaced material receiving compartments, herein a centrally located compartment 5 and end compartments 6 and 7 disposed on opposite sides of the central compartment. These compartments are of relatively large capacity and are arranged in a relatively low position with respect to the propelling and steering wheels, close to the ground surface so that the overall height of the vehicle is maintained at a minimum. The compartments are so arranged and constructed that spaces or recesses 8 are provided longitudinally between the central compartment 5 and the end compartments 6 and 7 and within the lateral limits of the vehicle body. The inner walls 9 of these recesses extend into the sides of the compartments, and the top walls 10 of the recesses also provide portions of the bottom walls of the compartments. These recesses or spaces are appropriately shaped to receive the steering and propelling wheels and the compartments are formed so that their inclined bottoms extend down laterally between the wheels. Arranged transversely of the compartments along their bottoms are endless conveyors 11, 12 and 13 for moving the material laterally from the compartments, and the compartments have large side openings 14 closed by closure members such as movable walls or doors 15 hinged at 16 at the tops of the sides of the vehicle body to swing outwardly toward an open position. These conveyors extend over the bottom of the vehicle body across the body into adjacency to the discharge openings 14 in the manner shown in Fig. 5.

The vehicle body, at its opposite ends, is formed to provide lateral recesses 17, 18 and 19, 20, and arranged in the recess 17 at the rear end of the vehicle is a suitable electrical control apparatus 21, while arranged in the recess 18 is an electric motor 22 for driving a suitable pump 23 which may supply liquid under pressure from a liquid tank 24 located beneath the motor, to the various hydraulically operated devices of the vehicle as will later be explained. Arranged in the recess 19 at the front end of the vehicle is an electric cable reel 25 for the power conductor cable 26 through which power medium may be conducted to the electric motors of the vehicle. This reel may be driven by a motor 27 which is preferably of the hydraulic type connected through suitable transmission means 28 to the reel. The recess 20 is formed to provide a station for the operator of the vehicle, and the various controls for the several power devices of the vehicle may be grouped near this operator's station so as to facilitate operation and control of the vehicle.

Now referring to the improved driving means for the conveyors 11, 12 and 13, it will be noted that located at the rear end of the vehicle beneath the inclined bottom of the rear end compartment 6 is an electric motor 29 having its power shaft connected through suitable transmission means 30 to a transmission shaft 31 which extends along the bottom of the vehicle body lengthwise of the latter. Bearings 32 carried by suitable bearing supports mounted within the vehicle body surround the shaft 31. Connectible to the shaft 31 by conventional clutches 33 are sleeve shafts 34 which are journaled in the bearings 32 and which themselves provide bearings for the shaft 31. Keyed to the shafts 34 are chain sprockets 35 which engage and drive the endless conveyors 11, 12 and 13. The motor 29 is reversible so that the conveyors may be driven selectively in either of opposite directions. Each of the conveyor control clutches 33 has a shifter 36 with which a shifter yoke 37 cooperates, and these shifter yokes are formed on reciprocable slide bars 38 arranged in guides 39 secured to the bottom of the vehicle body beneath the transverse conveyors.

The closure members of doors 15 which close the side openings 14 for the material receiving compartments are provided with latches 40 for rigidly locking the doors in closed position. These latches are pivoted at 41 on brackets 42 attached to the bottom of the vehicle body and are formed with cam slots 43 having inclined portions 44 and communicating straight portions 45. Engaged in these cam slots are pins 46 carried by slides 47 reciprocable transversely along the bottom of the vehicle body in the manner shown in Figs. 5 and 6. Slides 47 are connected for movement together by transverse rods 48. When the slides 47 are in the position shown in Fig. 5, the pins 46 are received in the straight portions 45 of the cam slots so that the latches 40 are rigidly held in their locking position. When the slides 47 are slid to the right in Fig. 5, the pin 46 for the left-hand latch 40 remains in the horizontal portion 45 of the cam slot so that the left-hand latch is maintained in locking position. When the right-hand slide moves toward the right in Fig. 5, its pin 46 engages the inclined portion 44 of the cam slot, thereby effecting swinging of the latch 40 into its released position indicated in dotted lines in Fig. 5, thereby unlocking the right-hand door. When the slides are shifted laterally in the opposite direction, the right-hand latch is maintained in locked position when the left-hand door latch is released. It is accordingly evident that one or the other of the doors 15 at the opposite sides of the compartments is maintained locked while the other door is released so that the material may be selectively discharged from the compartments through the side of the vehicle body. The shiftable latch control rods 48 are engaged by shipper yokes 49, and secured to the rods are horizontal cam plates 50 having cam slots 51. Each of the reciprocable slides 38 for the shifter yokes 37 for the conveyor clutches carries a pin 52, and these pins are engaged in the cam slots 51 of the cam plates 50 so that when the latch operating rod 48 is moved in one direction or the other, the clutch shifter yokes are moved to effect application of the conveyor clutches. It is accordingly evident that the control means for the door latches 40 and the operating means for the clutches 33 are coordinated so that whenever one of the latches is released a conveyor clutch is subsequently applied. Thus the doors at one side of the vehicle body are always unlocked before the conveyors are operated to effect discharge of the material from the compartments. By such an arrangement, the conveyors may be so operated and the doors so controlled that the material may be discharged from the compartments selectively through either side of the vehicle body.

In this construction, arranged in the recess 20 providing the operator's station are control levers 55, 56 and 57 for operating the control means, and, as shown in Fig. 10, these levers are connected by links 58 to levers 59, 60 and 61 (see also Fig. 11). These latter levers are secured to coaxially arranged operating shafts 62, 63 and 64 respectively. These shafts extend longitudinally along the bottom portion of the vehicle body, and the shaft 62 has secured thereto the shipper yoke 49 for the operating means for the door latches and conveyor clutch for the rear compartment 6. The operating shafts 63 and 64 are operatively connected to the control means for the door latches and conveyor clutches for the compartments 5 and 7 respectively.

The rear traction or propelling wheels 3 are shown as mounted on a rigid axle 65 extending transversely across the vehicle body and rigidly secured to the bottom of the vehicle body in the manner shown in Fig. 7. Secured to this rigid axle at its opposite ends and arranged in the recesses 8 for the propelling wheels are supports 66 by which motors 67 are carried. The motors 67 are preferably of the hydraulic type and are connected through suitable reduction gearing arranged within the wheels so that the traction wheels may be individually driven. The front steering wheels 4 have axle supports 68 pivoted to swing horizontally about upright pivot shafts 69 carried by brackets 70, the latter being mounted on the opposite ends of an axle 71 extending transversely across the bottom of the vehicle body. This transverse axle is pivoted at 72 midway between the sides of the vehicle body to rock in a vertical direction, thereby to facilitate movement of the vehicle over an uneven ground surface. Secured to the pivoted axle is a hydraulic cylinder 73 containing a reciprocable piston 74 having piston rods 75, 75 extending through the opposite cylinder heads 76. These piston rods are pivotally connected at 77 to links 78 which are in turn pivotally connected at 79 to arms 80 secured to the swingable axle supports 68. When liquid under pressure is supplied to the cylinder 73, the piston 74 may be moved to turn the steering wheels in one direction or the other.

Also arranged in the recess 20 near the operator's station is a valve box 81 containing control valves 82 and 83. The valve 82 may control the flow of liquid under pressure to the wheel driving motors 67 and reel driving motor 27 or to either of them. If desired an automatic by-pass for the reel driving motor may be provided so that the reel may turn freely in unwinding direction. The valve 83 may control the supply of liquid under pressure to the steering cylinder 73. Arranged near the valve box 81 is a control box 84 for suitable control switches 85 and 86 which are connected through the electrical control apparatus 21 to the electric motors 22 and 29.

The general mode of operation of the improved material haulage vehicle is as follows: The doors 15 at the opposite sides of the material receiving compartments 5, 6 and 7 are normally maintained locked in closed position by the door latches 40, and the conveyor clutches 33 are released so that the conveyors are idle. The compartments may then be filled with material such as loose coal in any suitable manner either by hand or by a mechanical loading machine, and, when the several compartments are filled, the operator located at his station in the recess 20 at the front end of the vehicle may operate the switch for controlling the pump driving motor 22, and the valve 82 may be actuated to effect supply of liquid under pressure from the pump 23 to the wheel driving motors 67 and the reel driving motor 27. As is usual in electric mining equipment, the power conductor cable 26 is extended from the mine passage in which the vehicle is located to the main power line in the main entry, and, as the loaded vehicle is moved forwardly away from the coal face under the propulsion of the traction wheels, the reel 25 is concurrently driven by the motor 27 in a direction to wind in the power conductor 26 in a well known manner. When the main entry is reached, the power conductor may be disconnected from the main power line and the motor 27 stopped or suitably by-passed and thereafter a usual trolley pole may be employed to conduct power medium from the main power line to the electric motor of the vehicle. When the loaded vehicle reaches its point of discharge in the main entry, the control switch for conveyor driving motor 29 may be operated to effect running of this motor. The operator may then actuate the control handles 55, 56 and 57 in the desired manner so that the doors 15 at one side of the vehicle body may be unlatched, and the conveyor clutches 33 may be applied to effect operation of the conveyors 11, 12 and 13 to discharge the material from the compartments laterally through the side of the vehicle. The conveyors may be concurrently or independently operated under the control of the clutches 33, and the door latches may be operated and the conveyors may be driven so that the material may be discharged from the compartments through either side of the vehicle body. When the material has been discharged from the compartments of the vehicle the doors may be again latched in closed position, and the conveyor drive clutches 33 may be released. The operator then may reverse the hydraulic wheel driving motors 67 and by-pass the reel driving motor 27 so that the empty vehicle may be propelled in a rearward direction back through the mine passage to the coal face when it may be again loaded. When the vehicle leaves the main entry, use of the trolley pole is discontinued, and, as the vehicle moves rearwardly into the mine passage, the reel is caused to pay out freely the conductor cable. By coordinating the control means for the door latches and conveyor clutches, it is impossible to operate the conveyors when the doors are locked closed.

As a result of this invention an improved material haulage vehicle is provided which has relatively large capacity and which is extremely low in height. It will further be evident that by the provision of the several material receiving compartments and the transverse conveyors, the material may be discharged from the compartments through a side of the vehicle body without increasing the overall height of the vehicle during such discharge. Further, by the novel arrangement of the compartments with respect to the propelling and steering wheels, close to the ground surface, a relatively low height and large capacity construction is provided while providing ample spaces for the steering and propelling wheels within the lateral limits of the vehicle. By coordinating the control means for the door latches with the clutch control means, it is impossible to operate the discharge conveyors while the doors are locked in closed position. By the provision of the reversible conveyors and the doors at the opposite sides of the compartments, it is possible to discharge the material laterally from either side of the vehicle. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a material haulage vehicle, a portable body having propelling and steering wheels adapted to run directly over a floor surface, said body having a material receiving compartment arranged in a relatively low position with respect to said wheels with the bottom of said body relatively close to the floor surface, said compartment having portions thereof extending longitudinally of said body laterally between the wheels, and a conveyor arranged transversely of said body at the bottom of said compartment intermediate the wheel axes with the bottom of said conveyor disposed below a horizontal plane including the wheel axes, and operable to move the material toward one side of said body laterally between the wheels, said compartment at the portions thereof which extend longitudinally between the wheels having inclined bottom walls whereby the material in said compartment may slide by gravity toward said conveyor, and said body having a movable wall at said side thereof for enabling discharge of the material moved by said conveyor laterally from said compartment.

2. In a material haulage vehicle, a portable body having propelling and steering wheels adapted to run directly over a floor surface, said body having a material receiving compartment arranged in a relatively low position with respect to said wheels with the bottom of said body relatively close to the floor surface, said compartment having portions thereof extending longitudinally of said body laterally between said wheels, and a reversible conveyor arranged transversely of said body at the bottom of said compartment intermediate the wheel axes with the bottom of said conveyor disposed below a horizontal plane including the wheel axes, and operable to move the material in either of opposite directions toward one side or the other of said body laterally between the wheels, said compartment at the portions thereof which extend longitudinally between the wheels having inclined bottom walls whereby the material in said compartment may slide by gravity toward said conveyor, and said body having movable side walls for enabling discharge of the material moved by said conveyor from said compartment at either side of said body.

3. In a material haulage vehicle for mines, a relatively low portable body having propelling and steering wheels adapted to run directly over the floor of a mine, said body having a plurality of material receiving compartments spaced longitudinally thereof with the bottoms of said compartments disposed a substantial distance below the tops of said wheels, said compartments having portions thereof extending longitudinally of said body laterally between said wheels, and conveyors arranged transversely of said body at the bottoms of said compartments respectively with the bottoms of said conveyors disposed below a horizontal plane including the wheel axes, and operable to move the material laterally toward discharge at one side of said body, and certain of the bottom walls of said compartments being inclined whereby the material in said compartments may slide toward said conveyors, and certain of said inclined bottom walls being formed on said compartment-portions which extend laterally between the wheels.

4. In a material haulage vehicle for mines, a relatively low portable body having propelling and steering wheels adapted to run directly over the floor of a mine, said body having a plurality of material receiving compartments spaced longitudinally thereof with the bottoms of said compartments disposed a substantial distance below the tops of said wheels, said compartment having portions thereof extending longitudinally of the body laterally between the wheels, and reversible conveyors arranged transversely of said body at the bottoms of said compartments respectively with the bottoms of said conveyors disposed below a horizontal plane including the wheel axes, and operable to move the material laterally toward discharge at either side of said body, said compartments having inclined bottom walls whereby the material in said compartments may slide by gravity toward said conveyors, and certain of said inclined bottom walls being formed on said compartment-portions which extend laterally between said wheels.

5. In a material haulage vehicle for mines, a portable body having propelling and steering wheels adapted to run directly over the floor of a mine, said body having a plurality of material receiving compartments spaced longitudinally thereof in a relatively low position with respect to said wheels with the bottoms of said compartments disposed a substantial distance below the tops of said wheels, said compartments having portions thereof extending longitudinally of the body laterally between the wheels, and conveyors arranged transversely of said body at the bottoms of said compartments respectively with the bottoms of said conveyors disposed below a horizontal plane including the wheel axes, and operable to move the material laterally toward one side of said body, said compartments having inclined bottom walls whereby the material in said compartments may slide by gravity toward said conveyors, and said bottom walls being formed in part on said longitudinally extending compartment portions, and said body having movable side walls for providing discharge openings at said side of said body through which the material moved by said conveyors may be discharged from said compartments.

6. In a material haulage vehicle for mines, a portable body having propelling and steering wheels adapted to run directly over the floor of a mine, said body having a plurality of material receiving compartments spaced longitudinally thereof in a relatively low position with respect to said wheels with the bottoms of said compartments disposed a substantial distance below the tops of said wheels, said compartments having portions thereof extending longitudinally of the body laterally between the wheels, and reversible conveyors arranged transversely of said body at the bottoms of said compartments respectively with the bottoms of said conveyors disposed below a horizontal plane including the wheel axes, and operable to move the material laterally in either of opposite directions toward either side of said body, said compartments having inclined bottom walls whereby the material in said compartments may slide by gravity toward said conveyors, and said bottom walls being formed in part on said compartment-portions which extend laterally between the wheels, and said body having movable side walls for providing discharge openings at the sides of said body through which the material moved by said conveyors may be discharged from said compartments at either side of said body.

7. In a material haulage vehicle for mines, a portable body having propelling and steering wheels adapted to run directly over the floor of a mine, said body having a plurality of material receiving compartments spaced longitudinally thereof, one centrally located compartment intermediate said wheels and end compartments at the opposite sides of said centrally located compartment, and conveyors arranged transversely of said body at the bottoms of said compartments for moving the material laterally toward one side of said body.

8. In a material haulage vehicle for mines, a portable body having propelling and steering wheels adapted to run directly over the floor of a mine, said body having a plurality of material receiving compartments spaced longitudinally thereof, one centrally located compartment intermediate said wheels and end compartments at the opposite sides of said centrally located compartment, said body being formed to provide recesses at the sides thereof for said wheels and the walls of said recesses extending into the sides of said compartments, and conveyors arranged transversely of said body at the bottoms of said compartments for moving the material laterally toward one side of said body.

9. In a material haulage vehicle for mines, a portable body having propelling and steering wheels adapted to run directly over the floor of a mine, said body having a plurality of material receiving compartments spaced longitudinally thereof, one centrally located compartment arranged longitudinally intermediate said wheels and end compartments arranged at the opposite sides of said centrally located compartment, said body being formed to provide recesses at the sides thereof for said wheels, and the walls of said recesses extending into the sides of said compartments.

10. In a material haulage vehicle for mines, a portable body having propelling and steering wheels adapted to run directly over the floor of a mine, said body having a plurality of material receiving compartments spaced longitudinally thereof, one centrally located compartment arranged longitudinally intermediate said wheels and end compartments arranged at the opposite sides of said centrally located compartment, conveyors arranged at the bottoms of said compartments for moving the material laterally from said compartments, said body being formed to provide recesses at the sides thereof for said wheels, and the walls of said recesses extending into said compartments and providing sloping surfaces for directing the material in said compartments toward said conveyors.

11. In a material haulage vehicle, a wheel supported body for receiving material to be transported, doors at the sides of said body whereby the material may be selectively discharged from said body through either side thereof, releasable locking means for locking said doors in closed position, means for conveying the material in said body to discharge at either side of the body irrespective of the bodily movement of the vehicle, and remote control means located near the operator's station at one end of said body and associated with said conveying means whereby said locking means may be selectively operated to effect release of one or the other of said doors prior to the operation of said conveying means and automatically in accordance with the direction in which the material is conveyed.

12. In a material haulage vehicle, a wheel supported body for receiving material to be transported, doors at the sides of said body whereby material may be selectively discharged from said body through either side thereof, releasable locking means for locking said doors in closed position, reversible conveyor means extending adjacent the bottom of said body for discharging the material through either side of the body, remote control means located near the operator's station at one end of said body whereby said locking means may be selectively operated to effect release of said doors, and control means located in juxtaposition to said remote control means for controlling the direction of operation of said conveyor means.

13. In a material haulage vehicle for mines, a portable body having propelling and steering wheels adapted to run directly over the floor of a mine, said body having three longitudinally spaced material receiving compartments, one compartment located centrally longitudinally between the steering and propelling wheels and the other compartments located at the ends of the vehicle body at the opposite sides of said centrally located compartment, said compartments being so arranged and said vehicle body being so constructed that spaces are provided longitudinally between the central and the end compartments within the lateral limits of the vehicle body at the sides of the vehicle, the steering and propelling wheels being located within said spaces, and said steering wheels having freedom of swinging movement in their spaces, and conveying means arranged transversely of the vehicle body at the bottoms of said compartments for moving the material to discharge laterally through one side of the vehicle body, said wheel spaces being arranged between said conveying means.

14. In a material haulage vehicle, an elongated relatively wide, low compact body divided into three longitudinally spaced material receiving compartments having side discharge openings, said body being so formed as to provide recesses in the sides thereof longitudinally between said compartments and within the lateral limits of the body, steering and propelling wheels arranged in said recesses, and releasable closure members for the discharge opening of each compartment whereby material may be discharged laterally through one side of the vehicle body without increasing the overall height of the vehicle during such discharge, the closure member for the intermediate compartment being located longitudinally of said body between said wheel recesses, and the closure members for the end compartments being located forwardly and rearwardly respectively with respect to said wheel recesses, and said closure members when closed having their lower edges disposed a substantial distance below a horizontal plane including the wheel axes.

15. In a material haulage vehicle, an elongated relatively wide, low compact body divided into three longitudinally spaced material receiving compartments having side discharge openings, said body being so formed as to provide recesses in the sides thereof longitudinally between said compartments and within the lateral limits of the body, steering and propelling wheels arranged in said recesses, and releasable closure members for the discharge opening of each compartment whereby material may be discharged laterally through one side of the vehicle body without increasing the overall height of the vehicle during such discharge, the closure member for the intermediate compartment being located longitudinally of said body between said wheel recesses, and the closure members for the end compartments being arranged forwardly and rearwardly respectively with respect to said wheel recesses, said closure members when closed having their lower edges disposed a substantial distance below a horizontal plane including the wheel axes, and conveying means extending transversely of the vehicle at the bottoms of said compartments for moving the material laterally from said compartments when said closure members are open, the horizontal plane including the wheel axes lying between horizontal planes including the top and bottom surfaces of said conveying means.

16. In a material haulage vehicle, an elongated relatively wide, low compact body divided into a plurality of longitudinally spaced material receiving compartments, steering and propelling wheels on which said body is mounted for steering and propelling the vehicle, conveying means extending transversely of the vehicle at the bottoms of said compartments for moving the material laterally from said compartments through a side of the vehicle body, and driving means for said conveying means including a motor driven transmission shaft extending longitudinally of the vehicle along the bottom of said body, and clutch means for connecting said conveying means either separately or concurrently in driving relation with said transmission shaft.

17. In a material haulage vehicle, a body having a material receiving compartment having a side discharge opening through which material in said compartment may be discharged laterally from one side of the vehicle, a closure member for said discharge opening, conveying means extending transversely of the vehicle at the bottom of said compartment for moving the material laterally from said compartment irrespective of the bodily movement of the vehicle, control means for said conveying means, means for locking said closure member in closed position, and means associated with said control means for assuring release of said locking means always prior to the initiation of operation of said conveying means.

18. In a material haulage vehicle for mines, a portable body having supporting wheels, said body arranged in a relatively low position with respect to said wheels and having a plurality of material receiving compartments spaced longitudinally thereof, said compartments including a centrally located compartment intermediate the wheel axes and end compartments at the opposite sides of said centrally located compartment, and conveyors arranged in a relatively low position transversely of said body at the bottoms respectively of said compartments for moving the material laterally to discharge at one side of said body.

19. In a material haulage vehicle for mines, a portable body having supporting wheels, said body arranged in a relatively low position with respect to said wheels and having a plurality of material receiving compartments spaced longitudinally thereof, said compartments including a centrally located compartment intermediate the wheel axes and end compartments at the opposite sides of said centrally located compartment, said body formed to provide recesses at the sides thereof for said wheels, and certain of the walls of said recesses extending into the sides of said compartment.

20. In a material haulage vehicle, a wheel supported body for receiving material to be transported, conveying means at the bottom of said body for conveying the material therein to discharge at either end of said conveying means, doors on said body at the ends of said conveying means whereby the material may be selectively discharged from the body at either end of said conveying means, releasible locking means for locking said doors in closed position, and remote control means located near the operator's station at one end of said body for selectively operating said locking means to effect release of said doors prior to the operation of said conveying means.

21. In a material haulage vehicle, a body having a material receiving compartment having a discharge opening through which material in said compartment may be discharged from the vehicle body, a movable closure member for said discharge opening, conveying means extending adjacent the bottom of said compartment for moving the material from said compartment irrespective of bodily movement of the vehicle, means for locking said closure member in closed position, control means for said conveying means, and means for assuring release of said locking means associated with said control means to unlock said closure member prior to the operation of said conveying means.

22. A material haulage vehicle for mines, a portable body having propelling and steering wheels adapted to run directly over the floor of a mine, said body having a material receiving compartment arranged in a relatively low position with respect to said wheels, conveying means arranged at the bottom of said compartment for moving the material from said compartment to discharge at one end of said conveying means, said body having a discharge opening at said end of said conveying means through which the material may be discharged, a closure member for said discharge opening, means for locking said closure member in closed position, remote control means located near the operator's station at one end of said body for operating said locking means to effect release of said closure member, and control means located near to said remote control means for controlling the operation of said conveying means.

23. In a material haulage vehicle, a wheel supported body for receiving material to be transported, endless conveying means adjacent the bottom of said body for moving the material from the body to discharge at one end of said conveying means, said body having a discharge opening at said end of said conveying means through which the material may be discharged, closure means mounted on said body to move relative thereto and relative to said conveying means for closing said opening to retain the material in said body during transport, means operable at the operator's station at a point remote from said closure means for effecting release of said closure means while said conveying means remains inoperative, and control means for said conveying means arranged near said operating means for said release means.

24. In a material haulage vehicle, a wheel supported body for receiving material to be transported, reversible endless conveying means at the bottom of said body for moving the material from said body to discharge at either end of said conveying means, said body having openings at said ends of said conveying means through which the material may be discharged, closure means mounted on said body for movement relative thereto for closing said openings respectively to retain the material in said body during transport, means operable from the operator's station at one end of said body for effecting release of either of said closure means while said conveying means remains inoperative, means for driving said conveying means in either direction irrespective of the bodily movement of the vehicle, and control means for said driving means arranged near said operating means for said release means.

CHARLES F. OSGOOD.